(12) United States Patent  (10) Patent No.: US 8,690,334 B2
Eguchi  (45) Date of Patent: Apr. 8, 2014

(54) PROJECTOR, PROJECTION SYSTEM, AND CONTROL METHOD OF PROJECTOR

(75) Inventor: Makoto Eguchi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 135 days.

(21) Appl. No.: 13/323,963

(22) Filed: Dec. 13, 2011

(65) Prior Publication Data

US 2012/0162608 A1   Jun. 28, 2012

(30) Foreign Application Priority Data

Dec. 22, 2010   (JP) ................................. 2010-285974

(51) Int. Cl.
   *G03B 21/00*   (2006.01)
(52) U.S. Cl.
   USPC .......... 353/7; 353/8; 353/30; 353/70; 353/84; 353/98; 349/5; 349/8; 359/464; 359/466
(58) Field of Classification Search
   USPC ............... 353/7–8, 20, 30–31, 69–70, 84, 98; 359/1, 15, 464, 466, 475; 348/744–747, 800, 840; 349/5, 7–9
   See application file for complete search history.

(56) References Cited

U.S. PATENT DOCUMENTS

| 6,314,248 | B1 | 11/2001 | Ohmura et al. | |
| 8,066,377 | B1* | 11/2011 | Husak et al. | ........................ 353/7 |
| 2002/0001472 | A1 | 1/2002 | Ohmura et al. | |
| 2002/0154404 | A1* | 10/2002 | Sedlmayr | ....................... 359/487 |
| 2004/0130645 | A1 | 7/2004 | Ohmura et al. | |
| 2009/0091708 | A1* | 4/2009 | Greene | ............................ 353/7 |
| 2010/0188489 | A1* | 7/2010 | Mashitani et al. | .............. 348/53 |
| 2011/0001808 | A1* | 1/2011 | Mentz et al. | .................... 348/59 |

FOREIGN PATENT DOCUMENTS

| JP | 11-331879 A | 11/1999 |
| JP | 3101542 B | 10/2000 |

* cited by examiner

*Primary Examiner* — Sultan Chowdhury
(74) *Attorney, Agent, or Firm* — ALG Intellectual Property, LLC

(57) ABSTRACT

A projector includes an image projection unit that projects an image for left eye and an image for right eye, and a transmitting unit that transmits a synchronizing signal for synchronization with switching between the image for left eye and the image for right eye. The transmitting unit is arranged to adjust a transmission direction of the synchronizing signal.

19 Claims, 17 Drawing Sheets

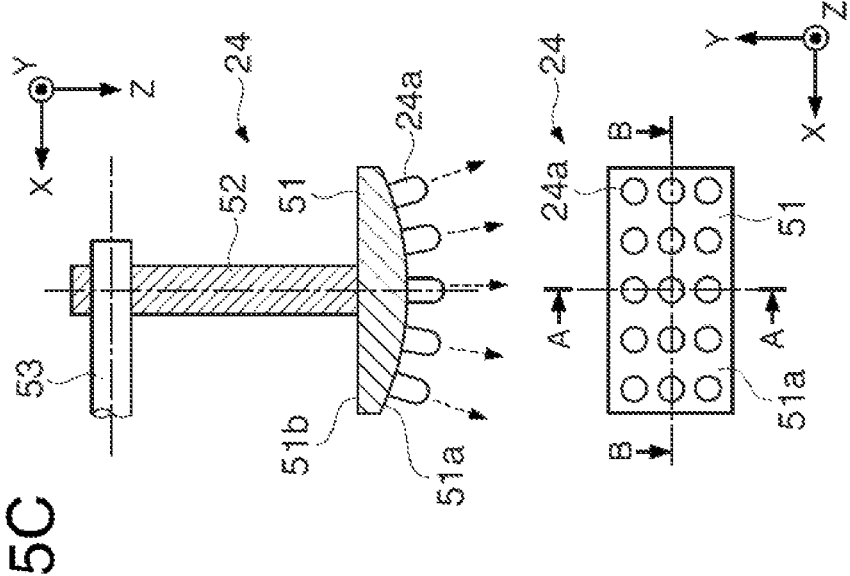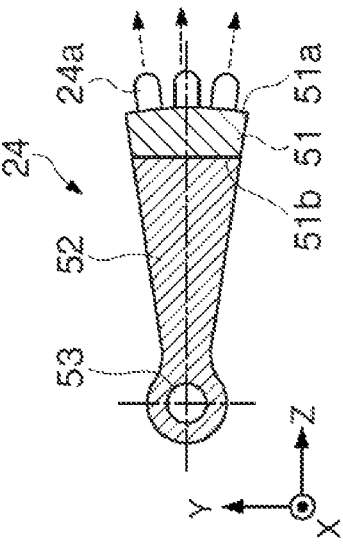

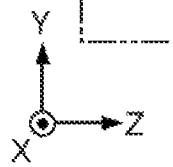

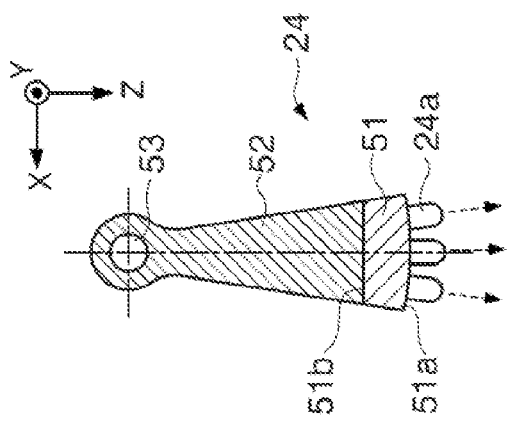
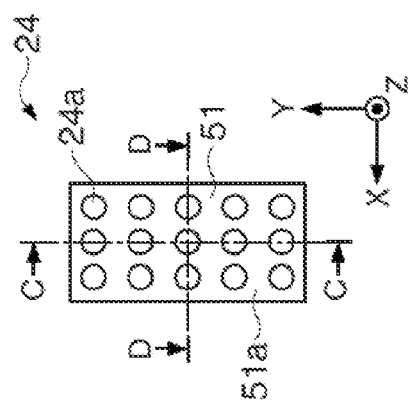
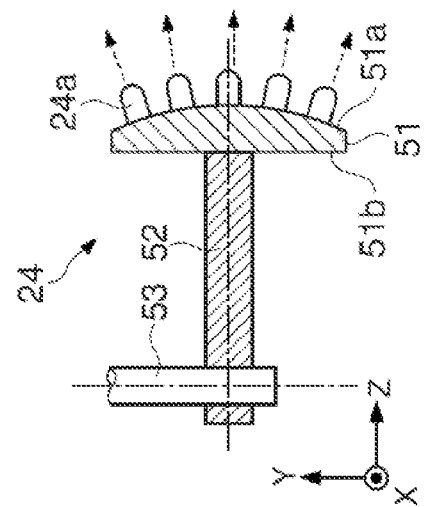
FIG. 8C
FIG. 8A
FIG. 8B

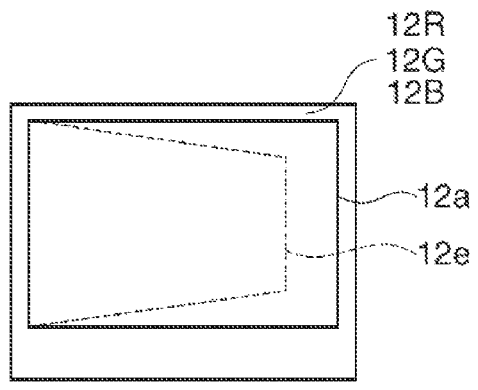
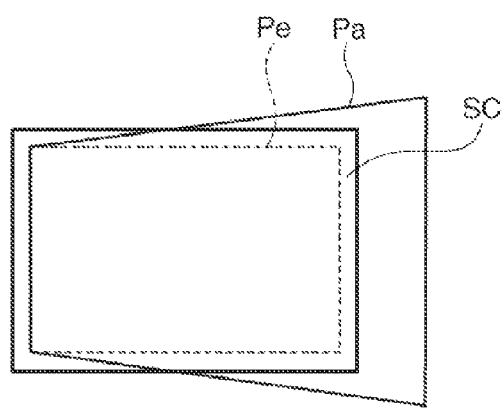
FIG. 16A  FIG. 16B
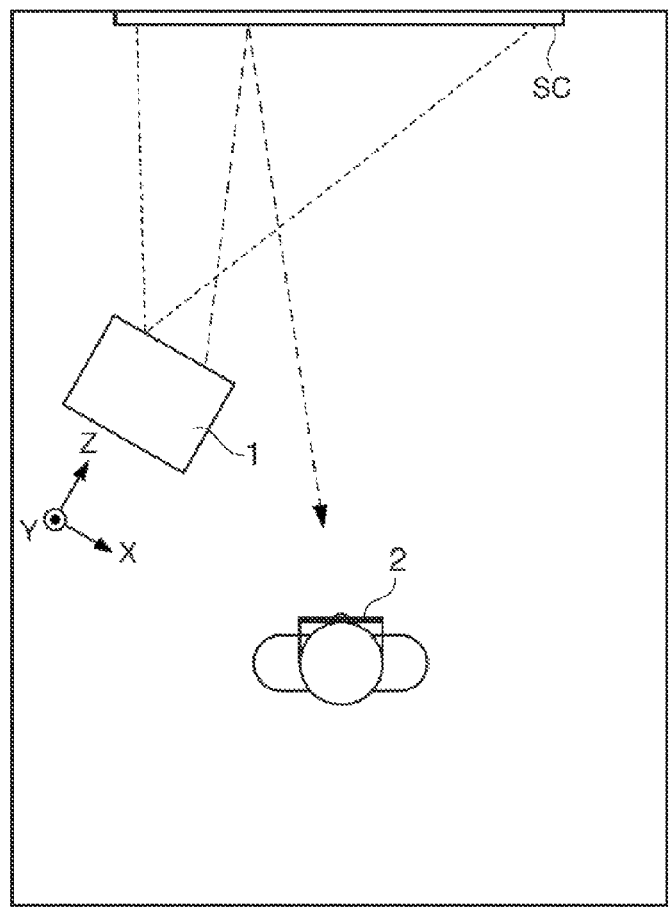
FIG. 16C

PROJECTOR, PROJECTION SYSTEM, AND CONTROL METHOD OF PROJECTOR

The entire disclosure of Japanese Patent Application No. 2010-285974 filed Dec. 22, 2010 is expressly incorporated by reference herein.

BACKGROUND

1. Technical Field

The present invention relates to a projector for a viewer to recognize a projected image as a stereoscopic image, a projection system, and a control method of the projector.

2. Related Art

In order that a viewer may recognize an image displayed by a projector as a stereoscopic image, various systems for right eye and left eye of the viewer to visually recognize respective different images (parallax images) have been proposed. As one of the systems, for example, there is a system in a mode in which a projector time-divisionally and alternately projects images for left eye and images for right eye. In this mode, the viewer may recognize stereoscopic images by viewing the images through shutter glasses for the left and right eyes alternately opening and closing in synchronization with switching between images. In a stereoscopic video system disclosed in Patent Document 1 (Japanese Patent No. 3101542), images are projected on a screen from a projector, and synchronizing signals (control signals) for controlling opening and closing of shutter glasses are output from an output unit of the projector, reflected by the screen, and received by the shutter glasses. Thereby, switching between images by the projector and opening and closing of the shutter glasses may be synchronized.

However, many projectors have high degrees of freedom of installation such that they may be mounted not only on a desk but also on a ceiling and a projection position of the images may be adjusted by a lens shift function or the like. Therefore the projectors may be used in various installation conditions. On the other hand, in the stereoscopic video system disclosed in Patent Document 1, an output direction of the synchronizing signal is determined by the installation condition (direction) of the projector, and there is a problem that a location where the shutter glasses can receive the synchronizing signal is limited depending on the installation condition of the projector.

Further, a system in a mode in which an output unit of a synchronizing signal is separated from a main body of a projector and the main body and the output unit are connected using a cable has been proposed. In this mode, the synchronizing signal may be transmitted in an arbitrary direction regardless of the installation condition of the projector and shutter glasses may easily receive the synchronizing signal. However, the output unit and the projector main body are separated and handling is complicated. Furthermore, in this mode, the main body and the output unit are connected by the cable, and an appearance after installation is degraded.

SUMMARY

An advantage of some aspects of the invention is to solve at least a part of the problems described above, and the invention can be implemented as the following aspects or application examples.

A projector according to an aspect of the invention includes an image projection unit that projects an image for left eye and an image for right eye, and a transmitting unit that transmits a synchronizing signal for synchronization with switching between the image for left eye and the image for right eye, wherein the transmitting unit is arranged to adjust a transmission direction of the synchronizing signal.

According to the projector, since the transmitting unit that transmits the synchronizing signal is arranged to adjust the transmission direction, the synchronizing signal may be transmitted in an appropriate direction in response to an installation condition of the projector.

Further, in the projector of the aspect of the invention, the transmitting unit may rotate, and adjustment of the transmission direction may be easily performed.

Furthermore, in the projector of the aspect of the invention, the transmitting unit may include plural transmitters, and the synchronizing signal may be transmitted in a wide range.

Moreover, in the projector of the aspect of the invention, the plural transmitters may be placed so that respective transmission directions may be different from one another, and the synchronizing signal may be transmitted in a wider range.

In addition, in the projector of the aspect of the invention, the transmission direction may be adjusted in response to the installation condition of the projector, and a user is not necessary to perform adjustment and the convenience is improved.

Further, in the projector of the aspect of the invention, a transmission direction adjustment unit may adjust the transmission direction in response to a position of the projector (a basic position or an inverted position), and the synchronizing signal may be transmitted in an appropriate direction in response to the position of the projector.

Furthermore, in the projector of the aspect of the invention, the transmission direction adjustment unit may adjust the transmission direction in response to a tilt of the projector with respect to a projection surface, and the synchronizing signal may be transmitted in an appropriate direction in response to the tilt of the projector.

Moreover, in the projector of the aspect of the invention, the transmission direction adjustment unit may adjust the transmission direction in response to an adjustment condition of a projection location, and the synchronizing signal may be transmitted in an appropriate direction in response to the projection location of the image, i.e., an installation location of the projector.

A projection system according to another aspect of the invention includes the projector according to any one of the application examples, and shutter glasses that receive the synchronizing signal transmitted from the projector and opens a shutter for left eye and a shutter for right eye based on the received synchronizing signal.

According to the projection system, the same advantages as those of the projector may be obtained.

A control method of a projector according to still another aspect of the invention is a control method of a projector including an image projection unit that projects an image for left eye and an image for right eye, and a transmitting unit that transmits a synchronizing signal for synchronization with switching between the image for left eye and the image for right eye, including projecting the image for left eye and the image for right eye by the image projection unit, transmitting the synchronizing signal by the transmitting unit, and adjusting a transmission direction of the synchronizing signal.

In the control method of the projector of the aspect of the invention, the transmission direction of the synchronizing signal may be adjusted in response to the installation condition of the projector, and the synchronizing signal may be transmitted in an appropriate direction in response to the installation condition of the projector.

BRIEF DESCRIPTION OF THE DRAWINGS

The invention will be described with reference to the accompanying drawings, wherein like numbers reference like elements.

FIG. 1A is a view seen from the rear and FIG. 1B is a view seen from the front.

FIGS. 5A to 5C show a transmitting unit of the first embodiment, and FIG. 5A is a front view, FIG. 5B is a sectional view along A-A thereof, and FIG. 5C is a sectional view along B-B.

FIG. 6A shows a state in which a synchronizing signal is transmitted forward to the front, FIG. 6B shows a state in which the synchronizing signal is transmitted slightly upward, and FIG. 6C shows a state in which the synchronizing signal is transmitted slightly downward.

FIG. 7A shows the case where the projector is installed in a basic position and FIG. 7B shows the case where the projector is ceiling-hung in an inverted position.

FIGS. 8A to 8C show a transmitting unit of the second embodiment, and FIG. 8A is a front view, FIG. 8B is a sectional view along C-C thereof, and FIG. 8C is a sectional view along D-D.

FIG. 10A shows the case where the projector is installed at the center in front of a projection surface and FIG. 10B shows the case where the projector is installed on the right of the projection surface.

FIG. 15A is a front view showing liquid crystal light valves, FIG. 15B is a front view showing a projection surface, and FIG. 15C is a side view showing a relationship between a tilt of a projector and the transmission direction of the synchronizing signal.

FIGS. 16A to 16C are explanatory diagrams for explanation of adjustment of a transmission direction of a synchronizing signal in a sixth embodiment, and FIG. 16A is a front view showing liquid crystal light valves, FIG. 16B is a front view showing a projection surface, and FIG. 16C is a plan view showing a relationship between a tilt of a projector and the transmission direction of the synchronizing signal.

DESCRIPTION OF EXEMPLARY EMBODIMENTS

First Embodiment

Figure 1A:
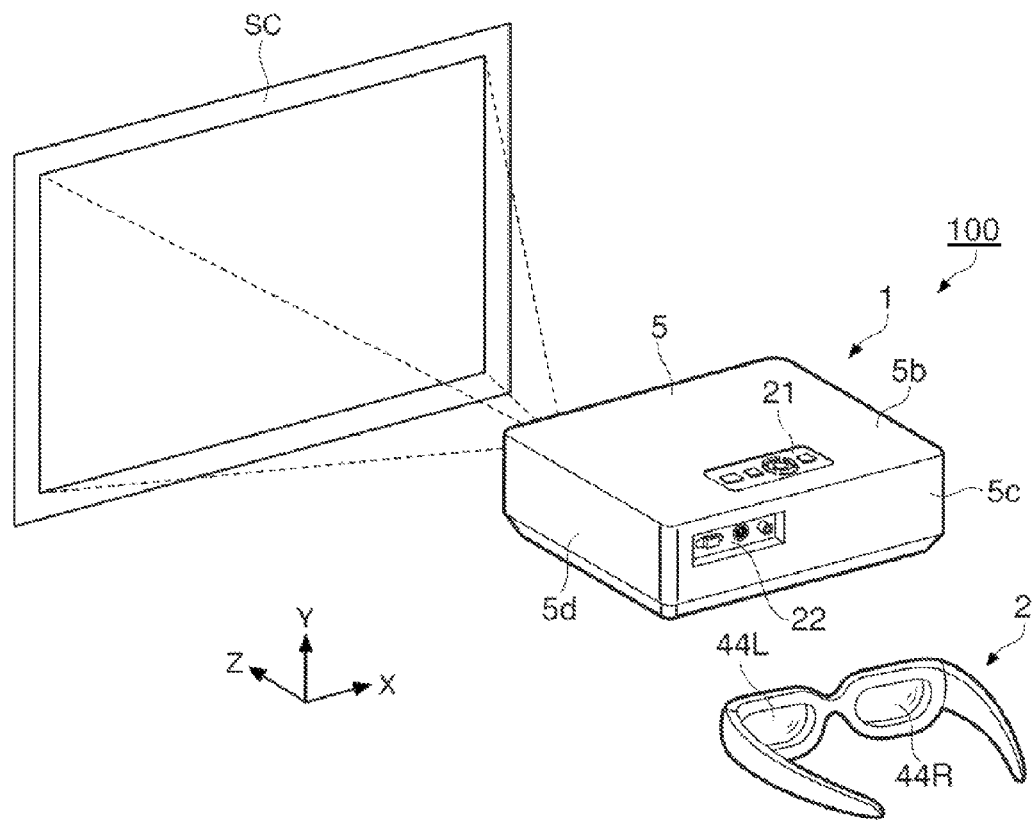
FIGS. 1A and 1B are perspective views showing a schematic configuration of a projection system of a first embodiment.
Figure 1B:
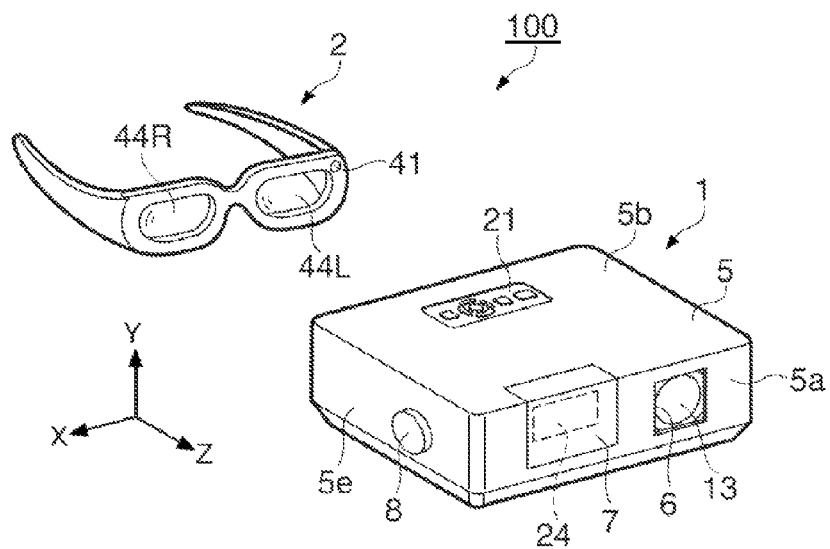
Figure 2:
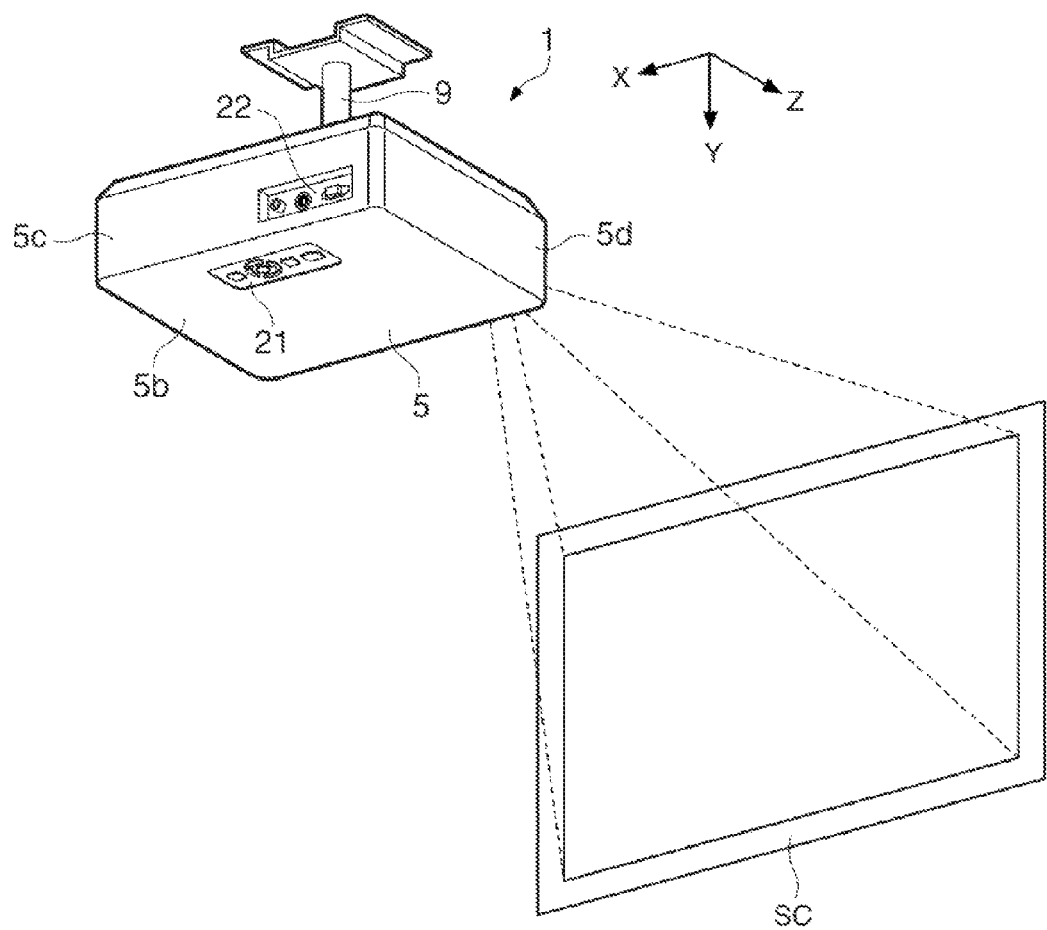
FIG. 2 is a perspective view showing a condition in which a projector is mounted on a ceiling.

As below, a projection system of the first embodiment will be explained with reference to the drawings. FIGS. 1A and 1B are perspective views showing a schematic configuration of a projection system of the first embodiment, and FIG. 1A is a view seen from the rear and FIG. 1B is a view seen from the front. FIG. 2 is a perspective view showing a condition in which a projector forming the projection system is mounted on a ceiling.

As shown in FIGS. 1A and 1B, a projection system 100 is a system for a viewer to recognize stereoscopic images using parallax of both eyes, and includes a projector 1 and liquid crystal shutter glasses 2.

The projector 1 includes a casing 5 containing a device main body (an image projection unit 10 etc., which will be described later), and an input operation unit 21 with which input operation is performed by a user is provided on a top surface 5b of the casing 5. On a rear surface 5c of the casing 5, an image information input unit 22 having plural input terminals is provided, and image information is input from an external image supply device (not shown) to the image information input unit 22. On a front surface 5a of the casing 5, an opening unit 6 is formed for exposing a projection lens 13, and an image based on the image information is projected on a projection surface (for example, a screen) SC in front. Note that, in the drawing, a direction forward, i.e., a direction from the front surface 5a of the casing 5 toward the outside of the casing 5 in parallel to an optical axis of the projection lens 13 is referred to as "+Z direction", a direction from the top surface 5b of the casing 5 toward the outside of the casing 5 perpendicular to the +Z direction is referred to as "+Y direction", and a direction toward right of the projection surface SC in a position with the top surface 5b directed upward perpendicular to the +Y direction and +Z direction is referred to as "+X direction".

Image information for left eye representing images for left eye and image information for right eye representing images for right eye are input to the image information input unit 22. The projector 1 time-divisionally and alternately projects (displays) the images for left eye and the images for right eye in units of frames on the projection surface SC. Further, the front surface 5a and the top surface 5b of the casing 5 are partially covered by a cover member 7 that is transmissive for infrared light, and a transmitting unit 24 that transmits an infrared synchronizing signal for synchronization with switching between the image for left eye and the image for right eye is provided inside of the cover member 7. The transmitting unit 24 is rotatable with respect to the casing 5 inside of the cover member 7, and a handle 8 for rotating the transmitting unit 24 is provided on a side surface 5e of the casing 5. The handle 8 corresponds to a manual adjustment unit for manual adjustment of a transmission direction of the transmitting unit 24.

The liquid crystal shutter glasses 2 are worn by a viewer who views images projected by the projector 1, and includes a liquid crystal shutter 44L for left eye facing the left eye and a liquid crystal shutter 44R for right eye facing the right eye of the viewer. Further, a receiving unit 41 for receiving the infrared synchronizing signal transmitted from the projector 1 is provided on a front surface of the liquid crystal shutter glasses 2, and the synchronizing signal transmitted from the projector 1 is reflected on the projection surface SC and received by the liquid crystal shutter glasses 2. The liquid crystal shutter glasses 2 alternately open the left and right liquid crystal shutters 44L, 44R in synchronization with the received synchronizing signals so that the image for left eye may be recognized with only the left eye of the viewer and the image for right eye may be recognized with only the right eye of the viewer.

Further, as shown in FIG. 2, the projector 1 can be mounted on a ceiling or the like (hereinafter, also referred to as "ceiling-hung"). In this case, a fixing bracket 9 for ceiling-hung is attached to a bottom surface (not shown) of the casing 5, and the projector 1 is mounted on the ceiling or the like in a position upside down (inverted position) by the fixing bracket 9. That is, the top surface 5b directed upward when the projector is installed on a desk or the like in a normal position (basic position) is directed downward in the inverted position.

Figure 3:
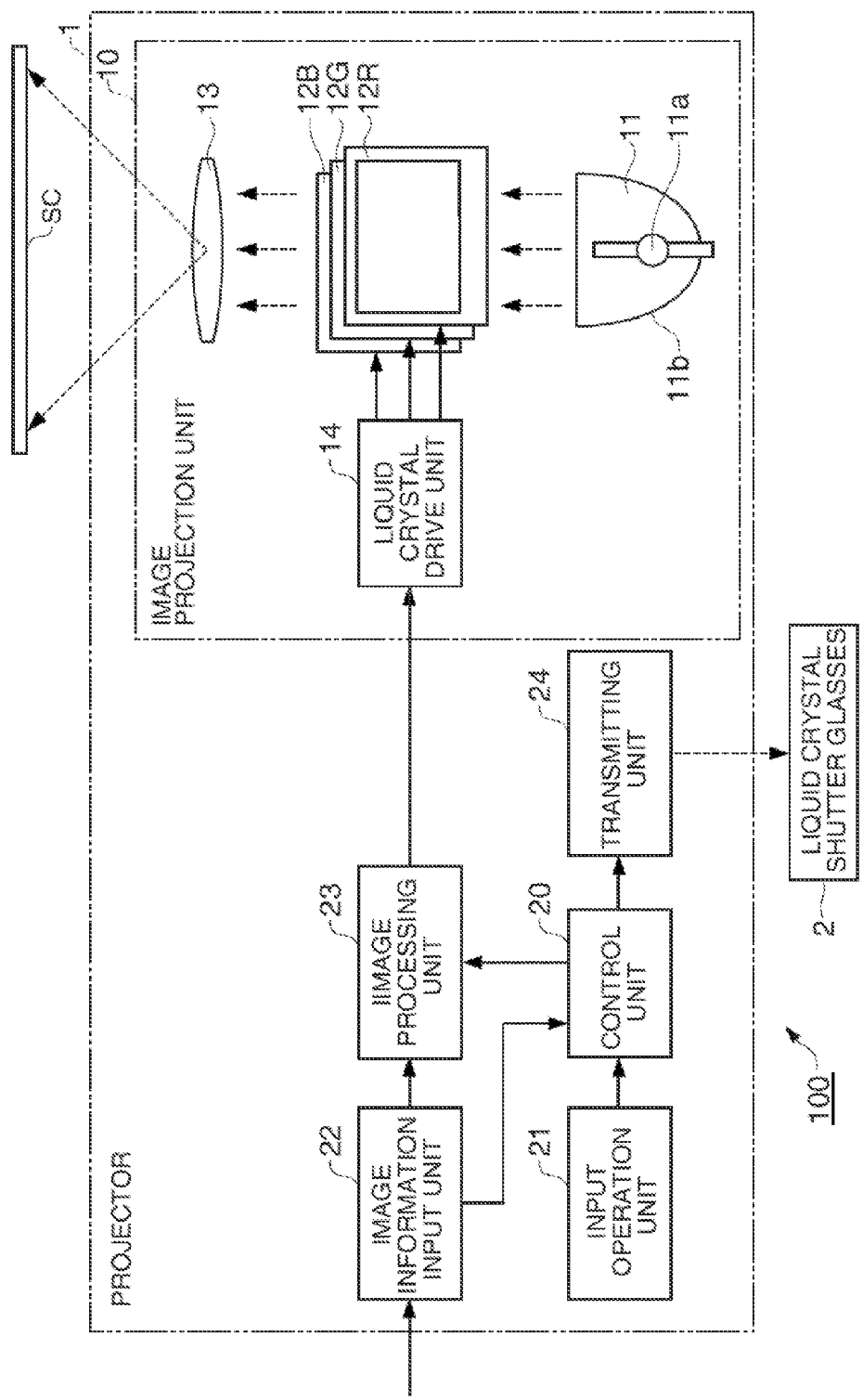
FIG. 3 is a block diagram showing an internal configuration of the projector according to the first embodiment.

FIG. 3 is a block diagram showing an internal configuration of the projector 1 according to the first embodiment. As shown in FIG. 3, the projector 1 includes the image projection unit 10, a control unit 20, the input operation unit 21, the image information input unit 22, an image processing unit 23, the transmitting unit 24, etc.

The image projection unit 10 includes a light source 11, three liquid crystal light valves 12R, 12G, 12B as light modulation devices, the projection lens 13 as a projection optical system, a liquid crystal drive unit 14, etc. The image projection unit 10 corresponds to a display unit, and modulates light emitted from the light source 11 using the liquid crystal light valves 12R, 12G, 12B. The liquid crystal light valves 12R, 12G, 12B modulates the light based on the image information for left eye or the image information for right eye alternately. Then, the image projection unit 10 projects the modulated light representing the images for left eye and the modulated light representing images for right eye forward (in the +Z direction) from the projection lens 13 and alternately displays them on the projection surface SC.

The light source 11 includes a discharge-type light source lamp 11a such as an ultrahigh pressure mercury lamp or a metal halide lamp, and a reflector 11b that reflects the light radiated from the light source lamp 11a toward the liquid crystal light valves 12R, 12G, 12B. The light output from the light source 11 is converted into light having a nearly uniform brightness distribution using an optical integration system (not shown), separated into respective color light components of red (R), green (G), and blue (B) as three primary colors of light using a color separation optical system (not shown), and then, respectively enters the liquid crystal light valves 12R, 12G, 12B.

The liquid crystal light valves 12R, 12G, 12B include liquid crystal panels with liquid crystal interposed between pairs of transparent substrates etc. In the liquid crystal light valves 12R, 12G, 12B, plural pixels arranged in matrices are formed and drive voltages can be applied to the liquid crystal with respect to respective pixels. Further, drive voltages in accordance with input image information are applied to the respective pixels by the liquid crystal drive unit 14, the respective pixels are set to light transmittance according to the image information. Accordingly, the light output from the light source 11 is modulated by transmission through the liquid crystal light valves 12R, 12G, 12B, and image lights according to the image information are formed with respect to each color light. The formed image lights of the respective colors are combined with respect to each pixel using a color combining optical system (not shown), and then, enlarged and projected from the projection lens 13.

The control unit 20 includes a CPU (Central Processing Unit), a RAM (Random Access Memory) used for temporary storage of various data and the like, a nonvolatile ROM (Read Only Memory), etc., and performs integrated control of the operation of the projector 1 by the CPU operating according to control programs stored in the ROM. That is, the control unit 20 functions as a computer.

The input operation unit 21 receives input operation of the user, and includes plural operation keys for the user to give various instructions to the projector 1. As the operation keys of the input operation unit 21 of the first embodiment, there are a power key for switching on and off of the power, a menu key for displaying a menu image for various settings, arrow keys used for selection of items in the menu image or the like, and an enter key for confirmation of the selected item, etc. When the user operates the various operation keys of the input operation unit 21, the input operation unit 21 receives the input operation and outputs an operation signal in response to the operation of the user to the control unit 20. Note that, as the input operation unit 21, a remote (not shown) that enables remote operation may be used. In this case, the remote sends an infrared operation signal in response to the operation of the user and receiving means (not shown) receives and transmits it to the control unit 20.

The image information for left eye and right eye is input from an external image supply device (not shown) such as a personal computer and various video reproduction devices to the image information input unit 22. Then, the image information input unit 22 outputs the input image information to the image processing unit 23. Further, a synchronizing signal (hereinafter, referred to as "reference synchronizing signal") for providing display timing of the images is input to the image information input unit 22 from the image supply device with the image information, and the image information input unit 22 outputs the reference synchronizing signal to the control unit 20.

The image processing unit 23 converts the image information for left eye and right eye input from the image information input unit 22 into image information representing gradation of the respective pixels of the liquid crystal light valves 12R, 12G, 12B. Here, the converted image information is separated for color lights of R, G, B and includes plural pixel values corresponding to all pixels of the respective liquid crystal light valves 12R, 12G, 12B. The pixel value determines light transmittance of the corresponding pixel and defines intensity (gradation) of the light output from each pixel. Further, the image processing unit 23 performs image quality adjustment processing for adjustment of brightness, contrast, and the like, OSD processing for displaying OSD (on-screen display) images of the menu image, a message image, and the like in superimposition, etc. on the converted image information according to instructions of the control unit 20.

The image processing unit 23 includes an image memory (not shown) that temporarily stores image information, and the image information for left eye and right eye is subjected to the above described various processing, and then, stored in the image memory in units of frames. Then, the image processing unit 23 outputs the image information for left eye and right eye stored in the image memory alternately for each frame to the liquid crystal drive unit 14 according to instructions of the control unit 20.

When the liquid crystal drive unit 14 drives the liquid crystal light valves 12R, 12G, 12B according to the image information input from the image processing unit 23, the liquid crystal light valves 12R, 12G, 12B form images in response to the image information and the images are projected from the projection lens 13. As a result, the images for left eye and the images for right eye are alternately displayed in units of frames on the projection surface SC.

The transmitting unit 24 includes plural light emitting devices 24a (see FIGS. 5A to 5C) that emit infrared light, and is provided to be rotatable with respect to the casing 5 inside of the casing 5 as described above. The transmitting unit 24 transmits an infrared synchronizing signal for synchronization with switching between the image for left eye and the image for right eye based on instructions of the control unit 20, and the liquid crystal shutter glasses 2 receive it.

The control unit 20 gives an instruction to the image processing unit 23 with a predetermined period according to the reference synchronizing signal from the image supply device to output the image information for left eye and the image information for right eye alternately for each frame, and gives an instruction to the transmitting unit 24 to transmit a synchronizing signal having a predetermined waveform pattern in synchronization with the output of the image information from the image processing unit 23. Then, the transmitting unit 24 transmits the infrared synchronizing signal in response to the instructions from the control unit 20.

Figure 4:
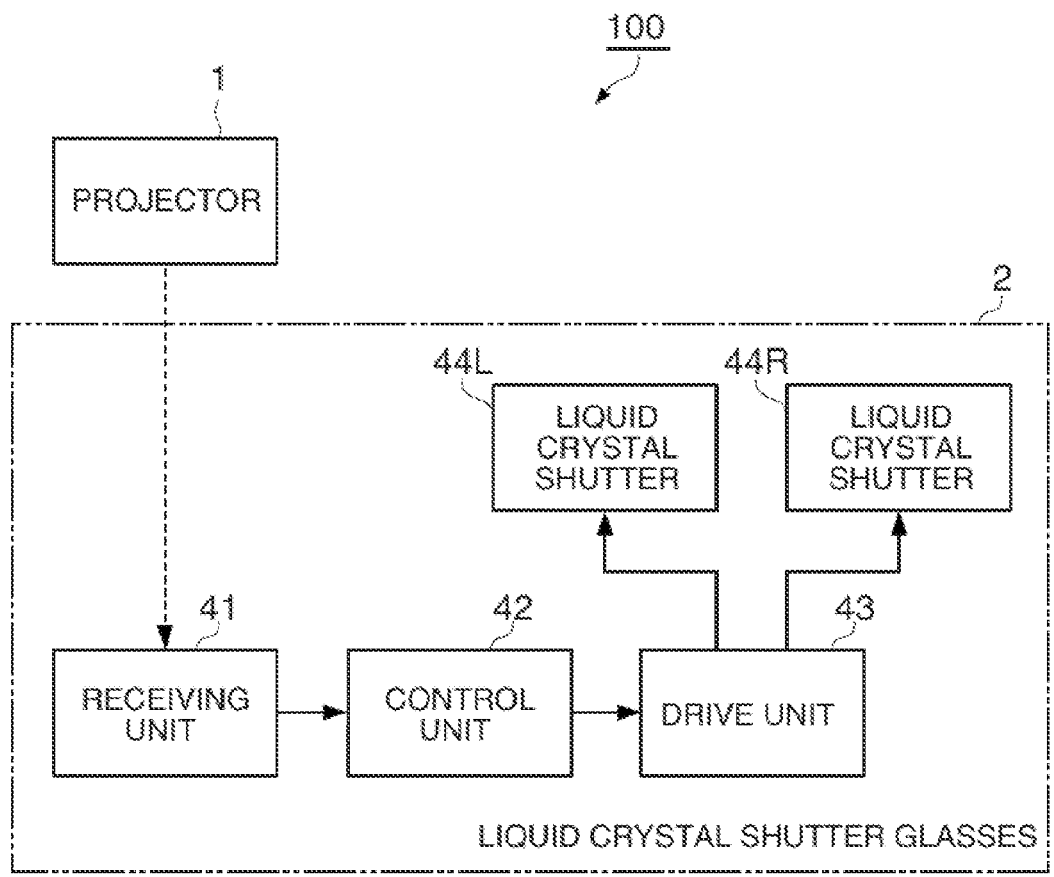
FIG. 4 is a block diagram showing an internal configuration of liquid crystal shutter glasses.

FIG. 4 is a block diagram showing an internal configuration of the liquid crystal shutter glasses 2.

As shown in FIG. 4, the liquid crystal shutter glasses 2 have the above described liquid crystal shutters 44L, 44R, the receiving unit 41, a control unit 42, and a drive unit 43. The receiving unit 41 includes a photosensor or the like, and receives the infrared synchronizing signal transmitted from the projector 1 and converts it into an electric signal.

The control unit 42 generates a control signal for controlling opening and closing of the liquid crystal shutters 44L, 44R according to the received synchronizing signal, and outputs it to the drive unit 43. The drive unit 43 drives opening and closing of the liquid crystal shutters 44L, 44R according to the input control signal.

Each of the liquid crystal shutters 44L, 44R has a configuration in which polarizers are bonded to both of the front and rear sides of the liquid crystal panel. The liquid crystal shutter 44L for left eye switches between an opened state for transmitting the light entering the left eye and a closed state for blocking the light entering the left eye by the driving of the drive unit 43, and the liquid crystal shutter 44R for right eye switches between an opened state for transmitting the light entering the right eye and a closed state for blocking the light entering the right eye by the driving of the drive unit 43.

Since the projection system 100 has the above described configuration, the image processing unit 23 of the projector 1 switches between display of the image for left eye and display of the image for right eye according to the instruction from the control unit 20, the liquid crystal shutter glasses 2 switch the opened liquid crystal shutters 44L, 44R according to the synchronizing signal transmitted from the projector 1, and thereby, the image for left eye may be recognized only by the left eye and the image for right eye may be recognized only by the right eye.

Next, the transmitting unit 24 of the projector 1 will be described in detail.

Figure 6A:
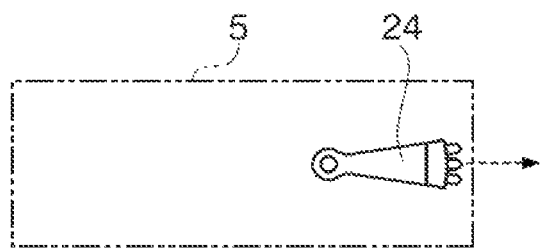
FIGS. 6A to 6C are side views showing states in which the transmitting unit rotates.
Figure 6B:
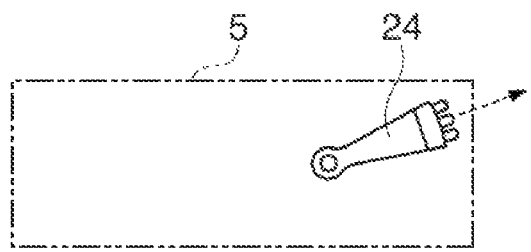
Figure 6C:
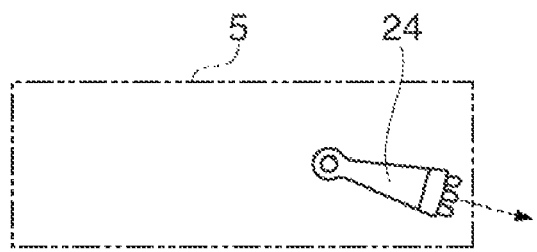

FIGS. 5A to 5C show the transmitting unit 24, and FIG. 5A is a front view, FIG. 5B is a sectional view along A-A thereof, and FIG. 5C is a sectional view along B-B. Further, FIGS. 6A to 6C are side views showing states in which the transmitting unit 24 rotates.

As shown in FIGS. 5A to 5C, the transmitting unit 24 includes a light emitting unit 51 having a rectangular shape in a front view. The light emitting unit 51 includes plural light emitting devices 24a as transmitters, and the respective light emitting devices 24a are arranged in a matrix on a front surface 51a of the light emitting unit 51. The front surface 51a of the light emitting unit 51 is formed in a spherical shape and the respective light emitting devices 24a output (transmit) synchronizing signals in perpendicular directions from respective locations of the front surface 51a. That is, the respective light emitting devices 24a are arranged so that respective transmission directions may be different from one another, and the synchronizing signals are output to be diverged from the transmitting unit 24.

One end of a support unit 52 supporting the light emitting unit 51 is fixed to a rear surface 51b of the light emitting unit 51. A rotation shaft 53 in parallel to the ±X directions is fixed to the other end of the support unit 52, and the transmitting unit 24 is rotatable around the rotation shaft 53. The rotation shaft 53 is connected to the handle 8 (see FIG. 1A), and the user may rotate the transmitting unit 24 by operating the handle 8 and change an output direction (transmission direction) of the synchronizing signal. Accordingly, the user may select not only a mode of transmitting the synchronizing signal forward (in the +Z direction) to the front (see FIG. 6A) but also a mode of transmitting slightly upward (toward the +Y side) (see FIG. 6B) or a mode of transmitting slightly downward (toward the −Y side) (see FIG. 6C).

Figure 7A:
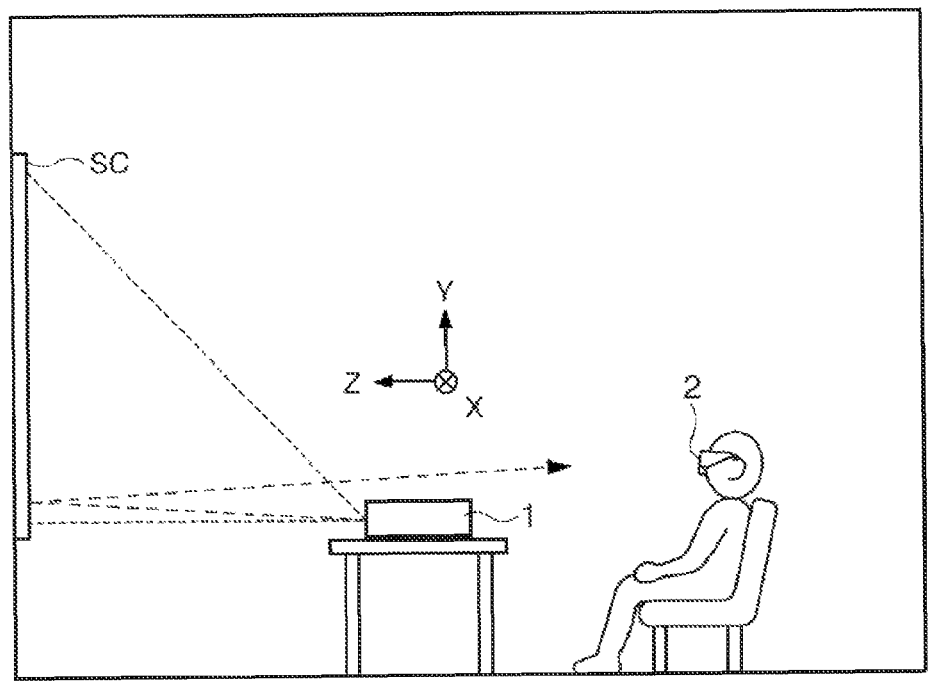
FIGS. 7A and 7B show side views showing relationships between an installation position of the projector and a transmission direction of the synchronizing signal.
Figure 7B:
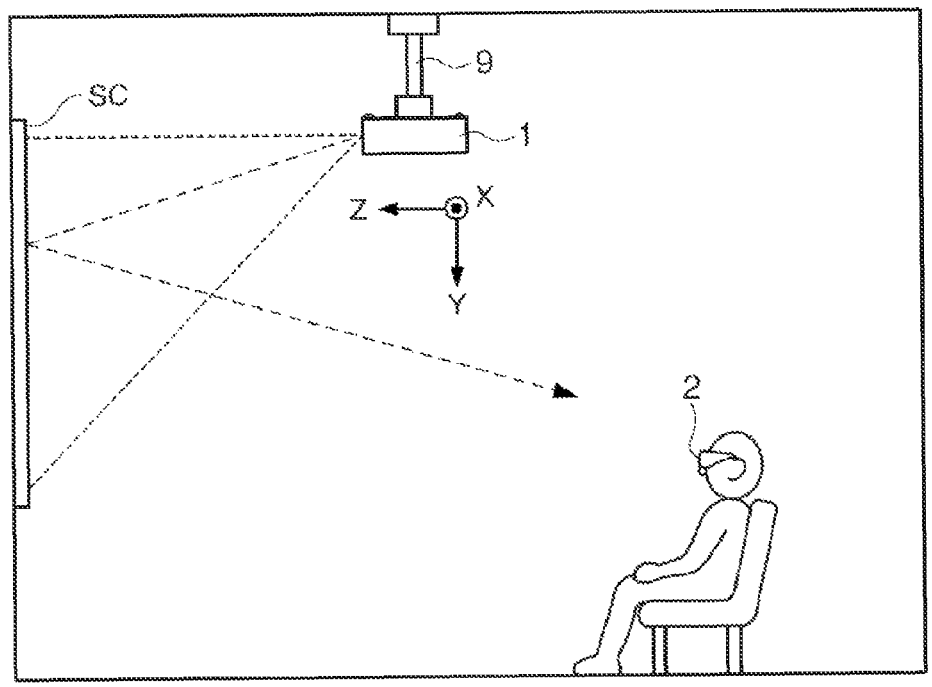

FIGS. 7A and 7B show side views showing relationships between an installation position of the projector 1 and a transmission direction of a synchronizing signal.

For example, as shown in FIG. 7A, in the case where the projector 1 is installed in a basic position on a desk or the like for projection of an image, the synchronizing signal may be transmitted forward (in the +Z direction) nearly to the front, and received by the liquid crystal shutter glasses 2. On the other hand, as shown in FIG. 7B, in the case where the projector 1 is ceiling-hung from a high ceiling in an inverted position, operation with the handle 8 may be performed so that the synchronizing signal may be transmitted slightly downward (toward the +Y side in the inverted position) because, if the synchronizing signal is transmitted forward to the front, the synchronizing signal may not be received by the liquid crystal shutter glasses 2.

As explained above, according to the projector 1 of the first embodiment, the following advantages may be obtained.

(1) According to the projector 1 of the first embodiment, since the transmitting unit 24 that transmits the synchronizing signal is arranged so that the transmission direction may be adjusted, the synchronizing signal can be transmitted in an appropriate direction in response to the installation condition of the projector 1. Further, since the transmitting unit 24 is integrally provided with the casing 5, compared to the case where it is separated from and connected to the casing 5 with a cable, handling is easy and the appearance after installation is not degraded.

(2) According to the projector 1 of the first embodiment, since the transmitting unit 24 has the rotatable configuration, the adjustment of the transmission direction can be performed easily.

(3) According to the projector 1 of the first embodiment, since the transmitting unit 24 includes the plural light emitting devices 24a, the synchronizing signals can be transmitted in a wide range.

(4) According to the projector 1 of the first embodiment, since the plural light emitting devices 24a are arranged so that the respective transmission directions may be different, the synchronizing signals can be transmitted in a wider range.

Second Embodiment

As below, a projection system of the second embodiment will be explained with reference to the drawings. An image projection unit 10 of a projector 1 of the second embodiment has a lens-shift function for adjustment of a location of a projected image (projection location). The lens-shift function is to shift the projection location by moving a projection lens 13 perpendicularly to an optical axis. Because of the function, it is not necessary to install the projector 1 at the center in the front of a projection surface SC, and the degree of freedom of installation of the projector 1 becomes higher. That is, the lens-shift function is a function of adjusting the installation location of the projector 1.

Figure 9:
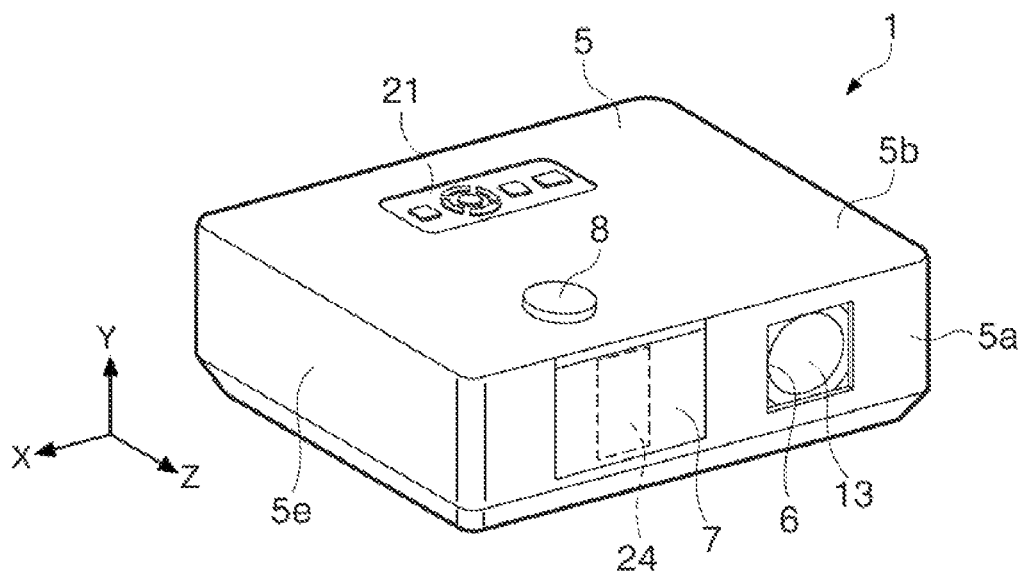
FIG. 9 is a perspective view showing a projector according to a second embodiment.

FIGS. 8A to 8C show a transmitting unit 24 of the second embodiment, and FIG. 8A is a front view, FIG. 8B is a sectional view along C-C thereof, and FIG. 8C is a sectional view along D-D. Further, FIG. 9 is a perspective view showing the projector 1 according to the second embodiment.

As shown in FIG. 8, the transmitting unit 24 of the second embodiment has the same shape as that of the transmitting unit 24 of the first embodiment, however, is placed so that its direction may be different by 90° from that of the first embodiment. Specifically, in the second embodiment, a rotation shaft 53 in parallel to the ±Y directions is fixed to an end of a support unit 52, and the transmitting unit 24 is rotatable around the rotation shaft 53. As shown in FIG. 9, a handle 8 connected to the rotation shaft 53 is provided on a top surface 5b of a casing 5, and the user may rotate the transmitting unit 24 by operating the handle 8 and horizontally change the transmission direction of the synchronizing signal. Accordingly, the user may select not only the mode of transmitting the synchronizing signal forward (in the +Z direction) to the front but also a mode of transmitting slightly rightward (toward the +X side) or a mode of transmitting slightly leftward (toward the −X side).

The rest of the configuration is the same as that of the first embodiment.

Figure 10B:
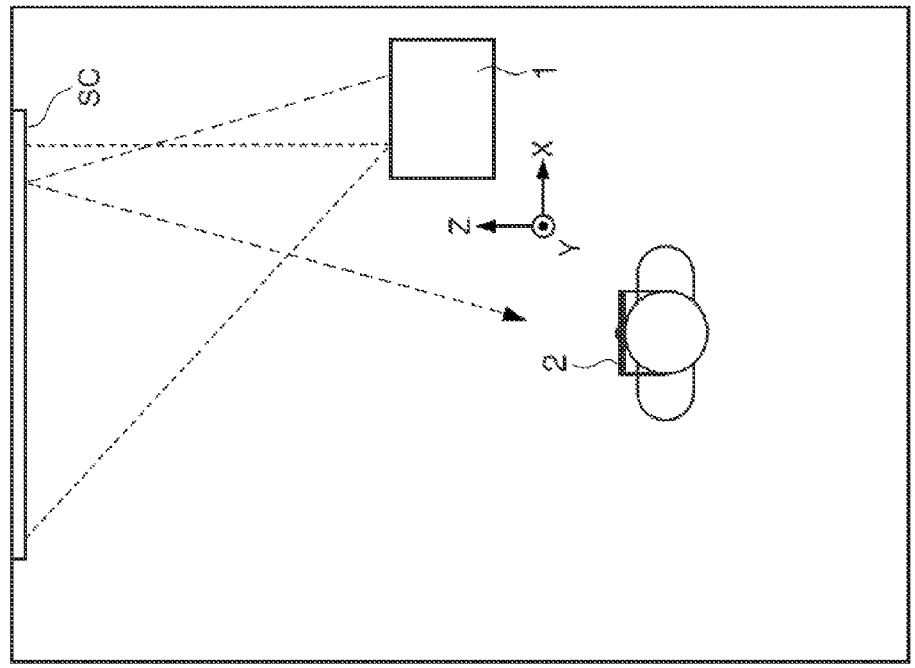
FIGS. 10A and 10B show plan views showing relationships between an installation location of the projector and a transmission direction of a synchronizing signal.
Figure 10A:
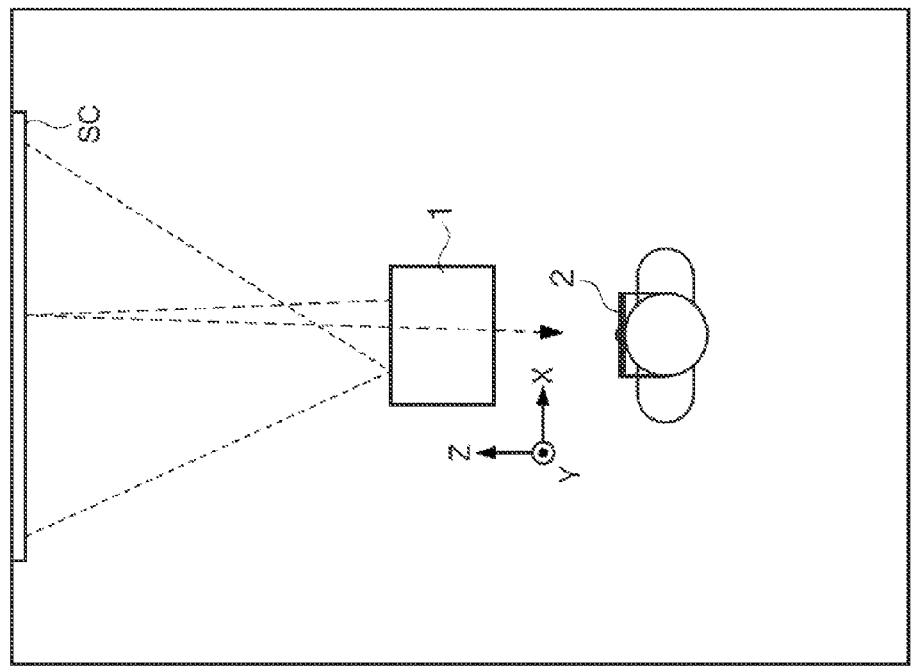

FIGS. 10A and 10B show plan views showing relationships between an installation location of the projector 1 and a transmission direction of a synchronizing signal.

For example, as shown in FIG. 10A, in the case where the projector 1 is installed at the center in front of the projection surface SC for projection of an image without using the lens-shift function and a viewer views the image at the center in front of the projection surface SC, the synchronizing signal may be transmitted forward (in the +Z direction) nearly to the front, and received by the liquid crystal shutter glasses 2. On the other hand, as shown in FIG. 10B, in the case where the projector 1 is installed on the right of the front center (on the right of the projection surface SC) and an image is projected on the left using the lens-shift function, operation with the handle 8 may be performed so that the synchronizing signal may be transmitted slightly leftward (toward the −X side) because, if the synchronizing signal is transmitted forward (in the +Z direction) to the front, the synchronizing signal may not be received by the liquid crystal shutter glasses 2 of the viewer on the left of the projector 1.

As explained above, according to the projector 1 of the second embodiment, the same advantages as those of the first embodiment can be obtained.

Note that, in the second embodiment, the case where the projection location is horizontally shifted to the right or left using the lens-shift function has been explained as an example, however, the second embodiment may be applied to the case of having the lens-shift function of vertically shifting the projection location using the projector 1 that can vertically rotate the transmitting unit 24 by the rotation shaft 53 in parallel to the ±X directions as is the case of the first embodiment.

Third Embodiment

As below, a projection system of the third embodiment will be explained with reference to the drawings. A projector 1 of the third embodiment has the same configuration as that of the first embodiment and a transmitting unit 24 may be vertically rotated by a rotation shaft 53 in parallel to the ±X directions, however, the transmitting unit 24 is arranged to be electrically rotated instead of being manually rotated with the handle 8.

Figure 11:
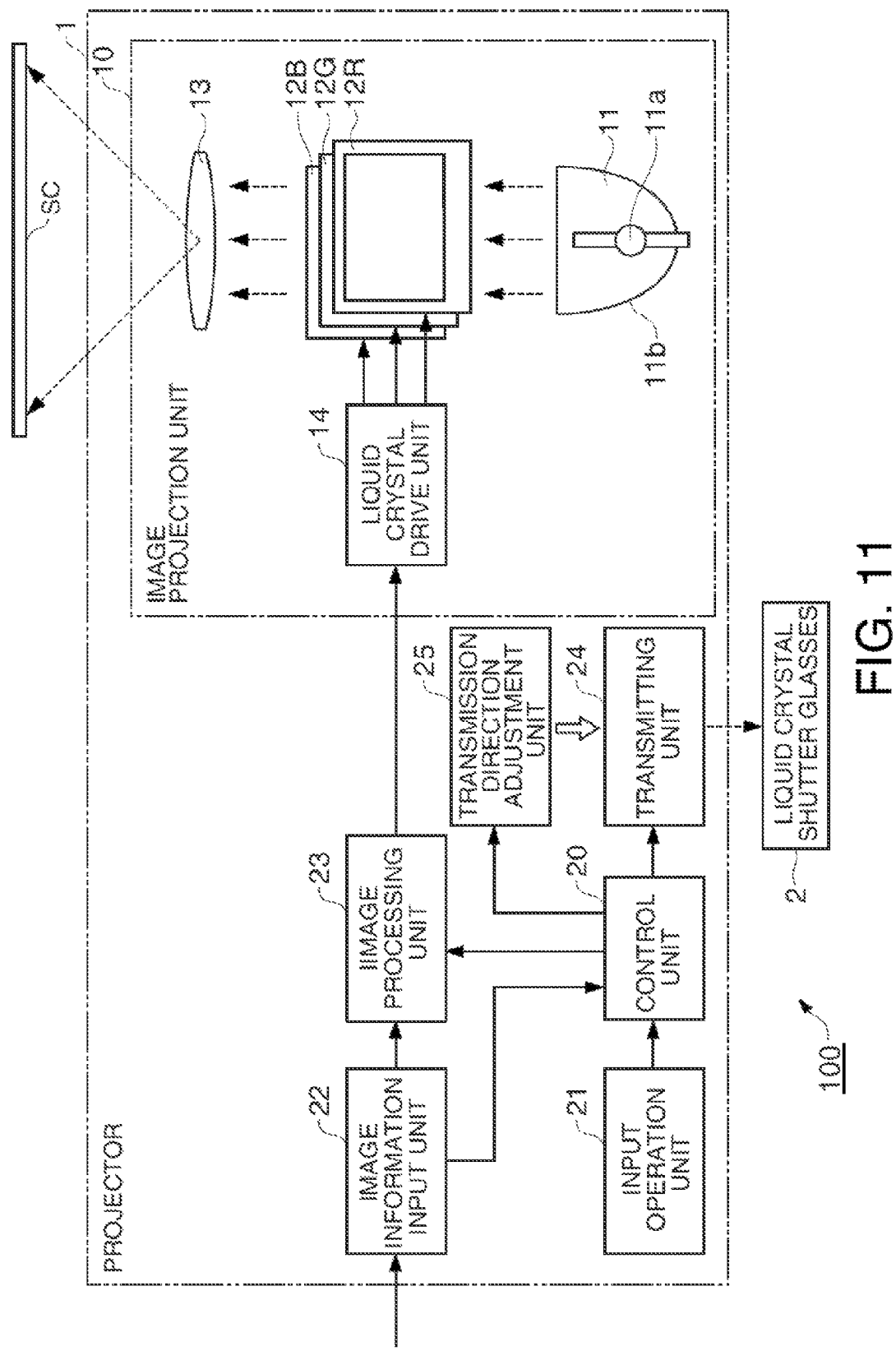
FIG. 11 is a block diagram showing an internal configuration of a projector according to a third embodiment.

FIG. 11 is a block diagram showing an internal configuration of the projector 1 according to the third embodiment. As shown in FIG. 11, the projector 1 of the third embodiment includes a transmission direction adjustment unit 25 that automatically adjusts a transmission direction of a synchronization signal. The transmission direction adjustment unit 25 includes a motor for rotating the rotation shaft 53 etc., and rotates the transmitting unit 24 according to the control of a control unit 20.

As is the case of the first embodiment, the projector 1 is installed in a normal basic position (see FIGS. 1A and 1B) when installed on a desk or the like, and fixed in an inverted position (see FIG. 2) in which the vertical direction of the basic position is inverted when ceiling-hung from a ceiling or the like. In the inverted position, the projected image also becomes upside down, and, in the case where the projector is ceiling-hung for use, it is necessary to intentionally invert the image (to rotate to 180°). The projector 1 is set to one of two installation modes of a normal mode corresponding to the basic position and a ceiling-hung mode corresponding to the inverted position. Further, when the installation mode is set to the ceiling-hung mode, the control unit 20 gives an instruction to the image processing unit 23 to perform processing of inverting the image.

When a menu key of an input operation unit 21 is operated by a user, the control unit 20 of the projector 1 gives an instruction to an image processing unit 23 to display an OSD image (setting menu image) (not shown) for various settings in superimposition. Then, when the user performs predetermined input operation according to the content of the setting menu image, the control unit 20 gives an instruction to the image processing unit 23 to display a menu image (installation mode selection image) for selection of the installation mode in superimposition.

Figure 12:
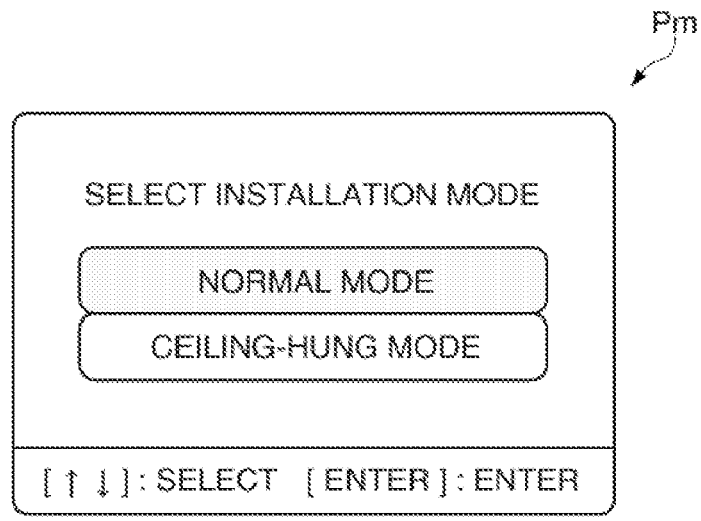
FIG. 12 is an explanatory diagram showing an installation mode selection image for installation mode selection.

FIG. 12 is an explanatory diagram showing an installation mode selection image for installation mode selection. As shown in FIG. 12, an installation mode selection image Pm includes two items of "normal mode" and "ceiling-hung mode" with a message prompting selection. The user may select the installation mode by designating a desired installation mode by operating an arrow key, and then, operating an enter key. Information on the installation mode selected by the user is stored in a ROM of the control unit 20.

When the normal mode is selected as the installation mode, the control unit 20 gives an instruction to the image processing unit 23 to perform subsequent image processing so that, if an image is projected in the basic position, the image may be displayed in a correct direction. On the other hand, when the ceiling-hung mode is selected as the installation mode, the control unit 20 gives an instruction to the image processing unit 23 to perform inversion processing so that, if an image is projected in the inverted position, the image may be displayed in a correct direction.

Further, when the normal mode is selected as the installation mode, the control unit 20 gives an instruction to the transmission direction adjustment unit 25 to transmit the synchronizing signal forward (in the +Z direction) nearly to the front (see FIG. 7A). On the other hand, when the ceiling-hung mode is selected as the installation mode, the control unit 20 gives an instruction to the transmission direction adjustment unit 25 to rotate the transmitting unit 24 so that the synchronizing signal may be transmitted slightly downward (toward the +Y direction in the inverted position) (see FIG. 7B). As shown in FIGS. 7A and 7B, a location of the user with respect to the projector 1 is different between the normal mode and the ceiling-hung mode. Accordingly, in order to appropriately transmit the synchronizing signal in a direction in which the user exists, it is preferable to adjust the transmission direction of the synchronizing signal in response to the installation mode. In FIGS. 7A and 7B, an angle formed by the projection direction of the projector 1 and the transmission direction of the synchronizing signal is larger in the normal mode than in the ceiling-hung mode. Note that "projection direction" refers to a direction nearly in parallel with the optical axis of a projection lens 13.

As explained above, according to the projector 1 of the third embodiment, since the transmission direction of the synchronizing signal is adjusted in response to the installation position of the projector 1, i.e., the setting of the installation mode, the synchronizing signal can be transmitted in an appropriate direction in response to the installation position. Further, when the user sets the installation mode, the synchronizing signal is transmitted in a direction appropriate for the set installation mode (installation position), and thus, the user is not necessary to adjust the transmission direction and the convenience of the user is improved.

Figure 13:
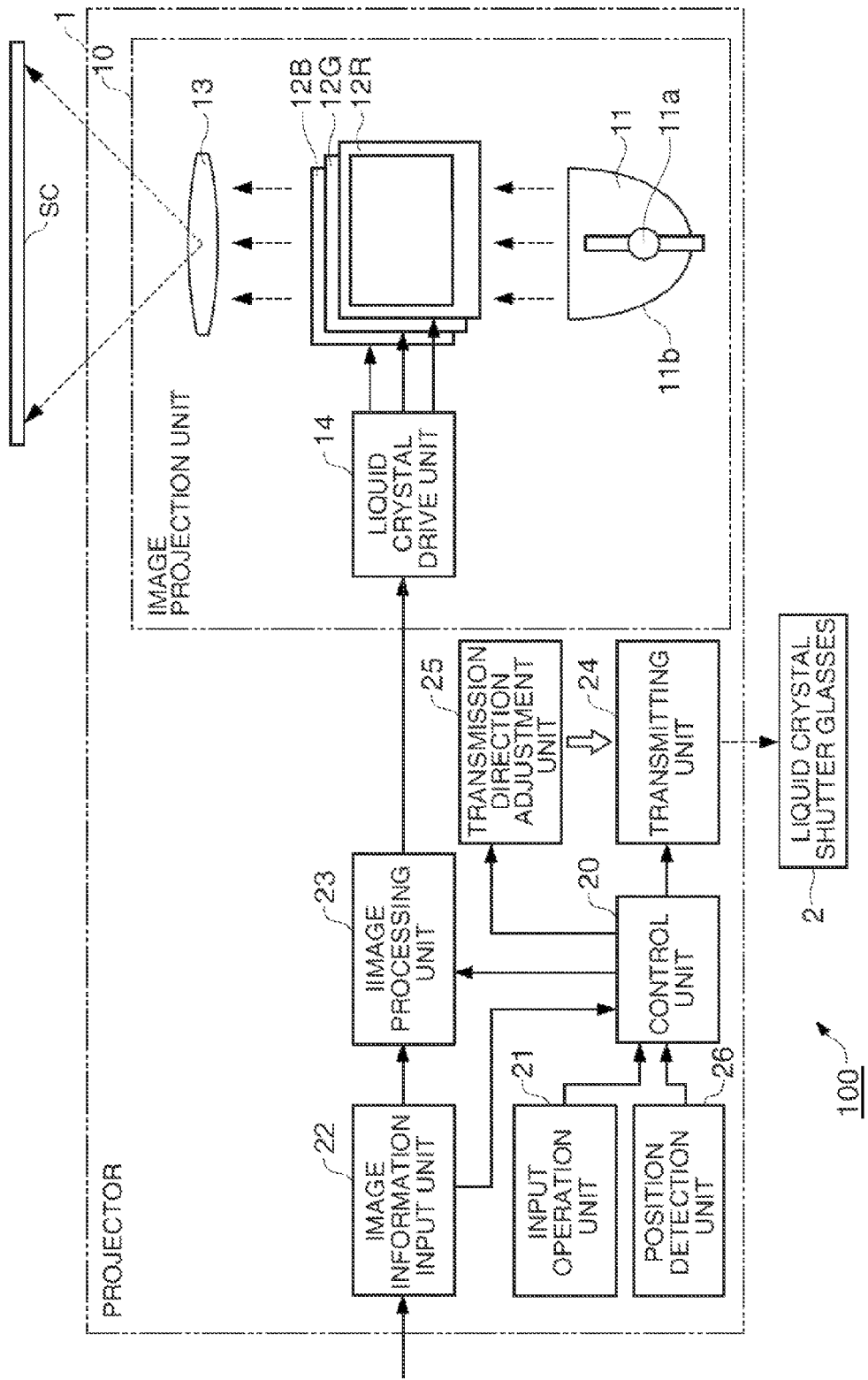
FIG. 13 is a block diagram showing an internal configuration of a projector according to another aspect of the third embodiment.

Note that, as shown in FIG. 13, a position detection unit 26 that detects the position of the projector 1 using an acceleration sensor or the like may be provided and the control unit 20 may set the installation mode and adjust the transmission direction of the synchronizing signal based on a detection result of the position detection unit 26. For example, when the position detected by the position detection unit 26 is the basic position, the control unit 20 sets the installation mode to the normal mode, and gives an instruction to the transmission direction adjustment unit 25 to transmit the synchronizing signal forward (in the +Z direction) nearly to the front. Further, when the position detected by the position detection unit 26 is the inverted position, the control unit 20 sets the installation mode to the ceiling-hung mode, and gives an instruction to the transmission direction adjustment unit 25 to rotate the transmitting unit 24 so that the synchronizing signal may be transmitted slightly downward. As described above, in the case where the installation mode is set and the transmission direction is adjusted based on the detection result of the position detection unit 26, it is not necessary to perform either the input operation for setting the installation mode or the operation for adjusting the transmission direction, and the convenience of the user is further improved.

Fourth Embodiment

As below, a projection system of the fourth embodiment will be explained with reference to the drawings. A projector 1 of the fourth embodiment has the same configuration as that of the second embodiment and has the lens-shift function, and a transmitting unit 24 may be horizontally rotated by a rotation shaft 53 in parallel to the ±Y directions. However, the transmitting unit 24 is arranged to be electrically rotated instead of being manually rotated by the handle 8.

Figure 14:
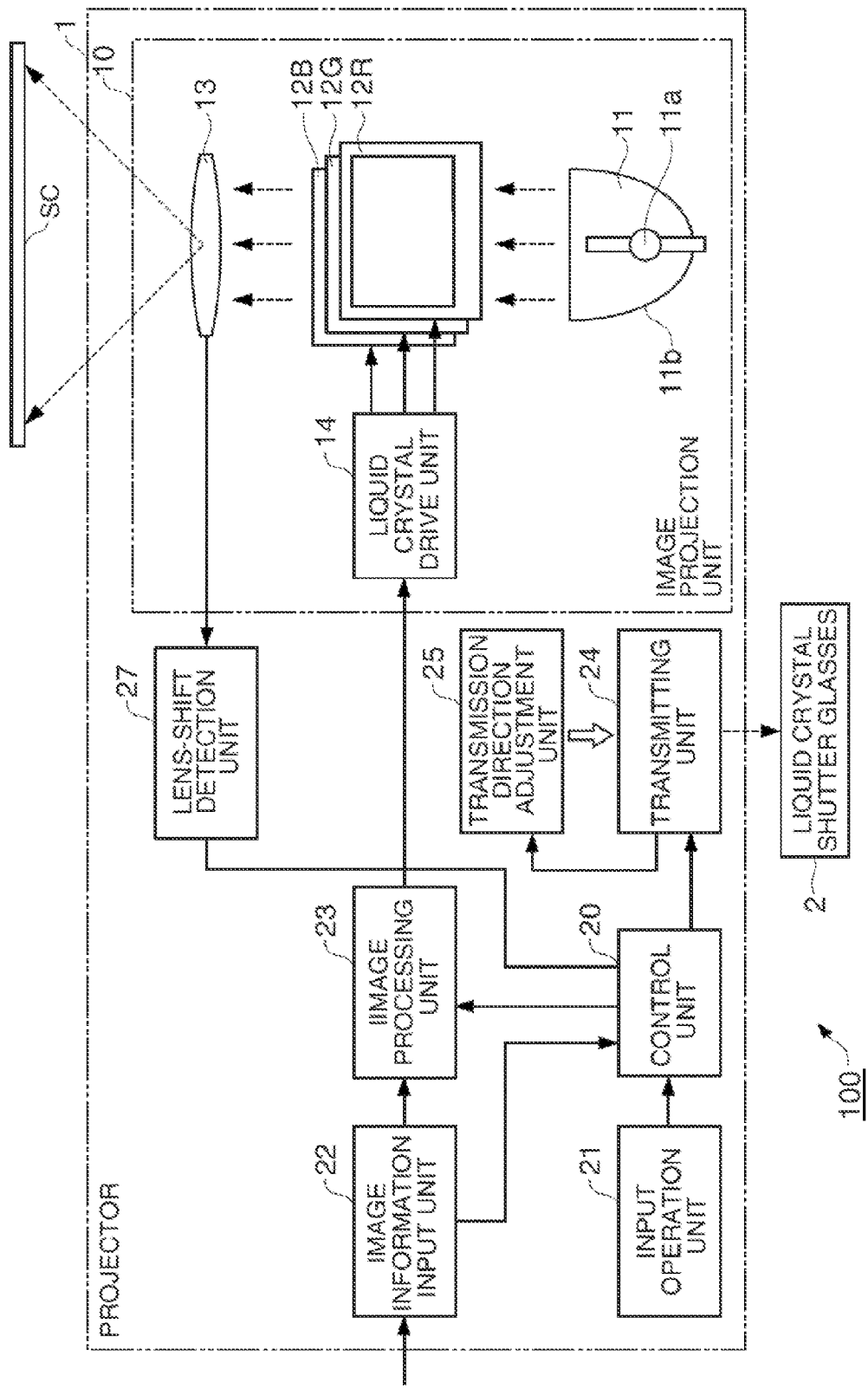
FIG. 14 is a block diagram showing an internal configuration of a projector according to a fourth embodiment.

FIG. 14 is a block diagram showing an internal configuration of the projector 1 according to the fourth embodiment. As shown in FIG. 14, the projector 1 according to the fourth embodiment includes a transmission direction adjustment unit 25 that automatically adjusts a transmission direction of a synchronization signal like that in the third embodiment. The transmission direction adjustment unit 25 includes a motor for rotating the rotation shaft 53 etc., and rotates the transmitting unit 24 according to the control of a control unit 20.

Further, the projector 1 includes a lens-shift detection unit 27 that detects an adjustment condition of a projection location by the lens-shift function based on a location of a projection lens 13 (the amount of shift from the reference location). Further, the control unit 20 of the fourth embodiment adjusts the transmission direction of the synchronizing signal in response to a detection result of the lens-shift detection unit 27.

For example, in the case where the lens-shift detection unit 27 detects projection of an image toward the front of the projector 1 without using the lens-shift function (shown in FIG. 10A), the control unit 20 gives an instruction to the transmission direction adjustment unit 25 to transmit the synchronizing signal forward (in the +Z direction) nearly to the front. Further, in the case where the lens-shift detection unit 27 detects projection of the image on the left using the lens-shift function (shown in FIG. 10B), the control unit 20 gives an instruction to the transmission direction adjustment unit 25 to rotate the transmitting unit 24 so that the synchronizing signal may be transmitted slightly leftward. Similarly, in the case where the lens-shift detection unit 27 detects the projection of the image on the right using the lens-shift function, the control unit 20 gives an instruction to the transmission direction adjustment unit 25 to rotate the transmitting unit 24 so that the synchronizing signal may be transmitted slightly rightward. In this manner, when the projection location of the image is adjusted using the lens-shift function, the control unit 20 allows transmission of the synchronizing signal toward the side to which the projection location shifts. Note that the transmission direction of the synchronizing signal may be adjusted in a stepwise manner in response to the amount of shift of the projection lens 13, or continuously changed.

As explained above, according to the projector 1 of the fourth embodiment, since the transmission direction of the synchronizing signal is adjusted in response to the adjustment condition of the projection location using the lens-shift function, the synchronizing signal can be transmitted in an appropriate direction in response to the projection location of the image, i.e., the installation location of the projector. Further, if the user adjusts the projection location using the lens-shift function, the synchronizing signal is transmitted in an appropriate direction in response to the adjusted projection location, and thus, the user is not necessary to adjust the transmission direction and the convenience of the user is improved.

Fifth Embodiment

As below, a projection system of the fifth embodiment will be explained with reference to the drawings. In a projector 1 of the fifth embodiment, as is the case of the third embodiment, a transmitting unit 24 may be electrically and vertically rotated by a rotation shaft 53 in parallel to the ±X directions. Further, an image processing unit 23 of the projector 1 has a trapezoidal distortion correction function and can correct trapezoidal distortion produced when an image is projected from an oblique direction with the projector 1 (casing 5) vertically tilted with respect to a projection surface SC.

The trapezoidal distortion is distortion that becomes larger, when an image is projected from an oblique direction, as the image projected on the projection surface SC is in a farther location from the projector 1. The image processing unit 23 performs correction of reducing the image as it is in the farther location from the projector 1 in advance so that the trapezoidal distortion may be cancelled out. When the trapezoidal distortion is produced, the user may adjust the amount of correction in response to the direction and the degree of the trapezoidal distortion by operating an input operation unit 21. Then, when the amount of correction is adjusted by the user, a control unit 20 gives an instruction to the image processing unit 23 to perform trapezoidal distortion correction in response to the amount of correction, and gives an instruction to a transmission direction adjustment unit 25 to adjust a transmission direction of the synchronizing signal in response to the amount of correction. Here, the amount of correction of the trapezoidal distortion changes in response to a tilt of a casing 5 with respect to the projection surface SC, and thus, the synchronizing signal may be transmitted in an appropriate direction in response to the tilt of the casing 5 by the above described adjustment.

Figure 15A:
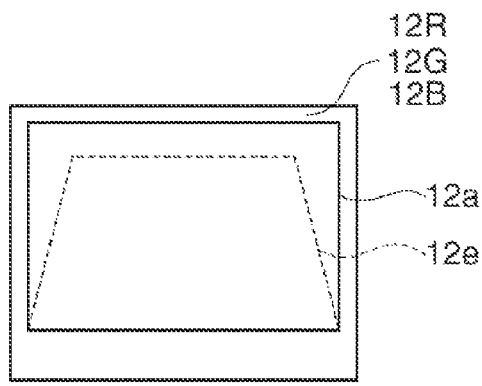
FIGS. 15A to 15C are explanatory diagrams for explanation of adjustment of a transmission direction of a synchronizing signal in a fifth embodiment.
Figure 15B:
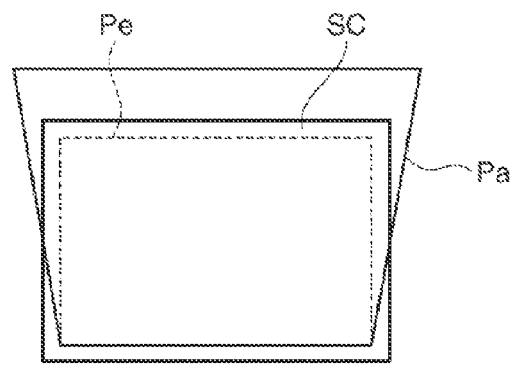
Figure 15C:
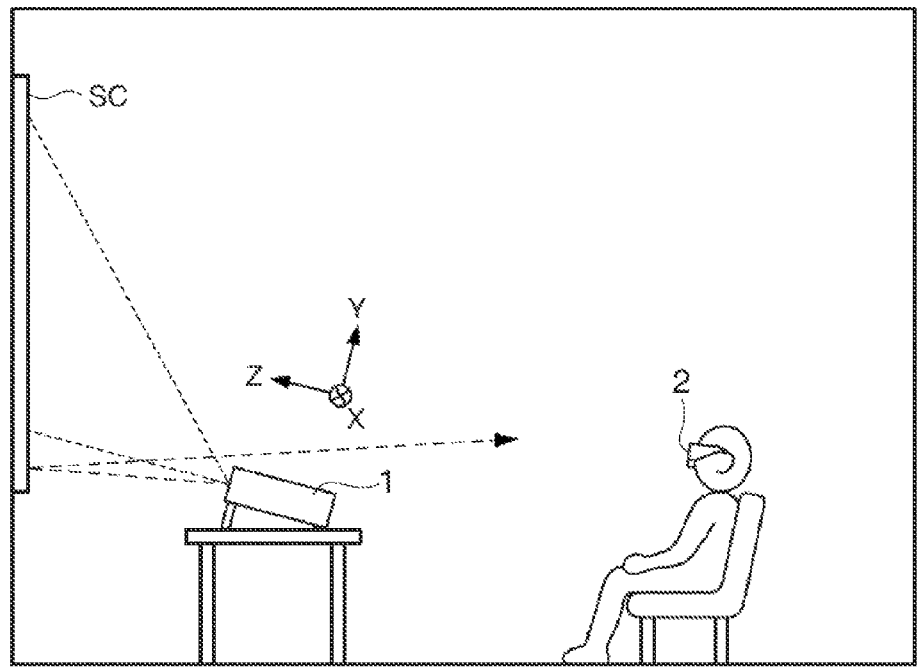

FIGS. 15A to 15C are explanatory diagrams for explanation of adjustment of the transmission direction of the synchronizing signal in the fifth embodiment, and FIG. 15A is a front view showing liquid crystal light valves 12R, 12G, 12B, FIG. 15B is a front view showing the projection surface SC, and FIG. 15C is a side view showing a relationship between the tilt of the projector 1 and the transmission direction of the synchronizing signal.

As shown in FIG. 15A, the liquid crystal light valves 12R, 12G, 12B include a rectangular display region 12a and an image is formed by plural pixels contained in the display region 12a. When the projector 1 faces toward the projection surface SC, an image is formed in the entire of the rectangular display region 12a, and this image is also displayed in a rectangular shape on the projection surface SC. On the other hand, when the projector 1 projects an image from an oblique direction, trapezoidal distortion is produced as shown in FIG. 15B. That is, the rectangular image formed in the entire of the rectangular display region 12a is displayed as a trapezoidal image Pa on the projection surface SC. In this regard, as shown in FIG. 15A, if an effective region 12e in which the trapezoidal distortion can be cancelled out is set within the display region 12a based on the amount of correction adjusted by the user, and the image is formed within the effective region 12e, the formed image is displayed as a rectangular image Pe on the projection surface SC and the trapezoidal distortion is corrected. Note that a region outside of the effective region 12e (ineffective region) is set in black, i.e., in a condition with the minimum light transmittance.

Here, as shown in FIG. 15A, in the case where the amount of correction adjusted by the user indicates the image is more reduced in the upper side than in the lower side, it is assumed that the projector 1 is installed at a tilt so that an image is projected obliquely above and the projected image is larger toward the upper side as shown in FIGS. 15B and 15C. Under the condition, if the synchronizing signal is transmitted from the casing 5 straight in the +Z direction, the signal is reflected upward by the projection surface SC. Accordingly, the control unit 20 gives an instruction to the transmission direction adjustment unit 25 to transmit the synchronizing signal slightly downward (toward the −Y side). Thereby, it becomes easier for liquid crystal shutter glasses 2 of a viewer who views an image in front of the projection surface SC to receive the synchronizing signal. Similarly, in the case where the amount of correction adjusted by the user indicates the image is more reduced in the lower side than in the upper side, it is assumed that the projected image is larger toward the lower side. In this case, the control unit 20 gives an instruction to the transmission direction adjustment unit 25 to transmit the synchronizing signal slightly upward (toward the +Y side). In this manner, when the projector 1 is tilted with respect to the projection surface SC for projection, the control unit 20 allows transmission of the synchronizing signal toward the opposite side to the side toward which an image is larger due to trapezoidal distortion caused by the tilt of the projector 1. On the other hand, when the amount of correction is zero, i.e., trapezoidal distortion correction is not performed, it is assumed that the projector 1 is installed at the center in front of the projection surface SC, and thus, the control unit 20 gives an instruction to the transmission direction adjustment unit 25 to transmit the synchronizing signal straight forward (in the +Z direction).

As explained above, according to the projector 1 of the fifth embodiment, since the transmission direction of the synchronizing signal is adjusted in response to the amount of correction of the trapezoidal distortion adjusted by the user, i.e., the tilt of the casing 5 with respect to the projection surface SC, the synchronizing signal can be transmitted in an appropriate direction in response to the tilt of the casing 5. Further, if the user adjusts the amount of correction of trapezoidal distortion, the synchronizing signal is transmitted in an appropriate direction, and thus, the user is not necessary to adjust the transmission direction and the convenience of the user is improved.

Sixth Embodiment

As below, a projection system of the sixth embodiment will be explained with reference to the drawings. In a projector 1 of the sixth embodiment, as is the case of the fourth embodiment, a transmitting unit 24 may be electrically and horizontally rotated by a rotation shaft 53 in parallel to the ±Y directions. Further, an image processing unit 23 of the projector 1 has a trapezoidal distortion correction function and can correct trapezoidal distortion produced when an image is projected from an oblique direction with a casing 5 horizontally tilted with respect to a projection surface SC. Further, when the amount of correction is adjusted by the user, a control unit 20 gives an instruction to the image processing unit 23 to perform trapezoidal distortion correction in response to the amount of correction, and gives an instruction to a transmission direction adjustment unit 25 to adjust a transmission direction of the synchronizing signal in response to the amount of correction.

FIGS. 16A to 16C are explanatory diagrams for explanation of adjustment of a transmission direction of a synchronizing signal in the sixth embodiment, and FIG. 16A is a front view showing liquid crystal light valves 12R, 12G, 12B, FIG. 16B is a front view showing the projection surface SC, and FIG. 16C is a plan view showing a relationship between a tilt of the projector 1 and the transmission direction of the synchronizing signal.

For example, as shown in FIG. 16A, in the case where the amount of correction adjusted by the user indicates the image is more reduced in the right side than in the left side, it is assumed that the projector 1 is installed at a tilt so that an image is projected obliquely forward right and the projected image is larger toward the right side as shown in FIGS. 16B and 16C. Under the condition, if the synchronizing signal is transmitted from the casing 5 straight in the +Z direction, the signal is reflected rightward by the projection surface SC. Accordingly, the control unit 20 gives an instruction to the transmission direction adjustment unit 25 to transmit the synchronizing signal slightly leftward (toward the −X side). Thereby, it becomes easier for liquid crystal shutter glasses 2 of a viewer who views an image in front of the projection surface SC to receive the synchronizing signal. Similarly, in the case where the amount of correction adjusted by the user indicates the image is more reduced in the left side than in the right side, it is assumed that the projected image is larger toward the left side. In this case, the control unit 20 gives an instruction to the transmission direction adjustment unit 25 to transmit the synchronizing signal slightly rightward (toward the +X side). In this manner, when the projector 1 is tilted with respect to the projection surface SC for projection as is the case of the fifth embodiment, the control unit 20 allows transmission of the synchronizing signal toward the opposite side to the side toward which an image is larger due to trapezoidal distortion. On the other hand, when the amount of correction is zero, i.e., trapezoidal distortion correction is not performed, it is assumed that the projector 1 is installed at the center in front of the projection surface SC, and thus, the control unit 20 gives an instruction to the transmission direction adjustment unit 25 to transmit the synchronizing signal straight forward (in the +Z direction).

As explained above, according to the projector 1 of the sixth embodiment, the same advantage as that of the fifth embodiment may be obtained.

Modified Examples

Further, the embodiments may be changed as below.

In the embodiments, the relationship between the installation condition of the projector 1 and the transmission direction of the synchronizing signal is not limited to those, but various modifications may be made. Further, in the embodiments, the transmission direction of the synchronizing signal has been adjusted by rotating the transmitting unit 24, not limited to that but other adjustment methods may be employed.

Figure 17A:
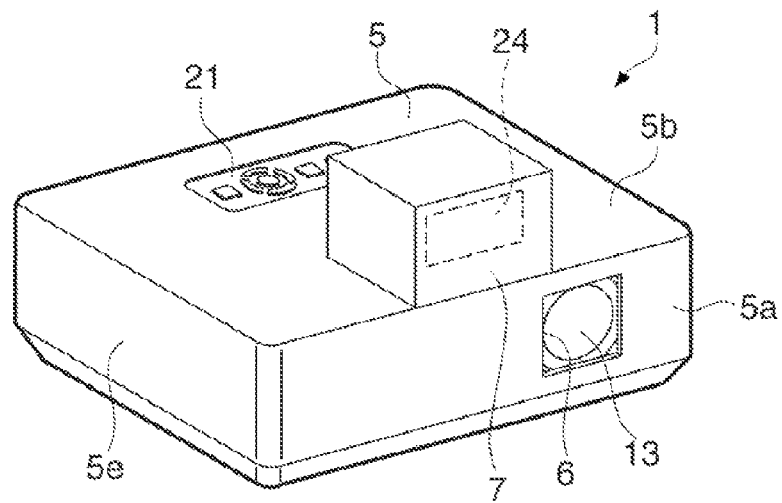
FIGS. 17A and 17B are perspective views showing projectors according to modified examples.
Figure 17B:
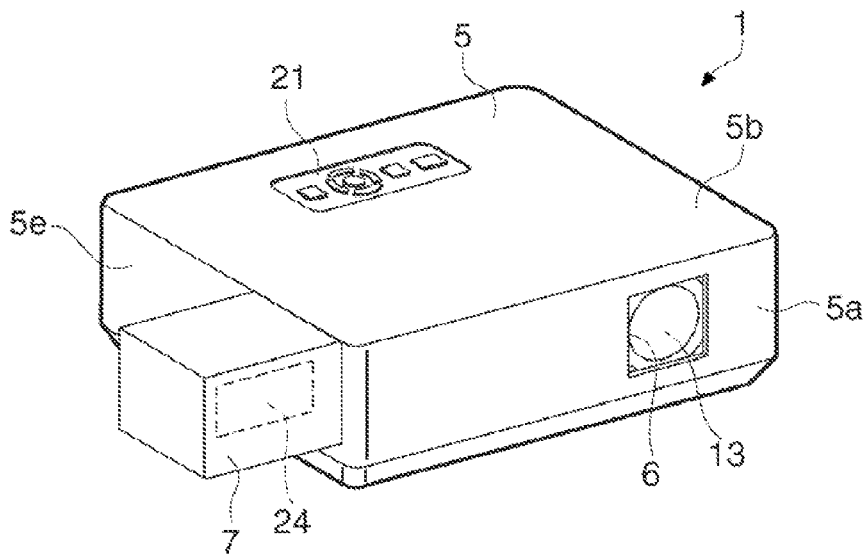

In the embodiments, the configuration in which the transmitting unit 24 is held within the casing 5 has been shown, but not limited to that as long as the transmitting unit 24 is integrally formed with (not separated from) the casing 5. For example, as shown in FIGS. 17A and 17B, the transmitting unit 24 may be mounted outside of the casing 5.

In the embodiments, the mode in which the transmitting unit 24 transmits the synchronizing signal forward (in the +Z direction) and the signal is reflected by the projection surface SC and received by the liquid crystal shutter glasses 2 has been shown, but not limited to the mode. For example, in the case of the configuration in which the projector 1 has a short focus projection lens 13, the projector 1 is installed immediately before the projection surface SC and the viewer is located after the surface, and thus, the synchronizing signal may be transmitted rearward (in the −Z direction) and directly received by the liquid crystal shutter glasses 2.

In the embodiments (the fifth and sixth embodiments), the transmission direction has been adjusted based on the amount of correction of trapezoidal distortion, however, for example, a vertical tilt of the casing 5 with respect to the projection surface SC may be detected by the position detection unit 26 shown in FIG. 13, and the transmission direction may be adjusted based on a detection result. Further, an imaging unit configured to image the projection surface SC in front may be provided and vertical and horizontal tilts of the casing 5 with respect to the projection surface SC may be detected based on the shape (distortion) of the projection surface SC (screen) contained in the taken image and the transmission direction may be adjusted based on a detection result.

In the embodiments, the transmitting unit 24 has been rotated vertically or horizontally by the rotation shaft 53 in parallel to the ±X directions or the ±Y directions, however, for example, if the transmitting unit 24 is formed to be rotatable around two axes, the transmission direction may be adjusted in an arbitrary direction of the vertical and horizontal directions.

In the embodiments, the receiving unit 41 of the liquid crystal shutter glasses 2 has been provided on the front surface of the liquid crystal shutter glasses 2, but not limited to that. That is, the liquid crystal shutter glasses 2 are not limited to the mode of receiving the synchronizing signal transmitted from before the viewer, but may be a mode of receiving the synchronizing signal transmitted from behind or right or left of the viewer.

In the embodiments, the liquid crystal shutter glasses 2 have alternately opened the left and right liquid crystal shutters 44L, 44R in synchronization with the received synchronizing signals, however, a state of closing both of the liquid crystal shutters 44L, 44R may be inserted between a state in which the left-eye liquid crystal shutter 44L is opened and the right-eye liquid crystal shutter 44R is closed and a state in which the right-eye liquid crystal shutter 44R is opened and the left-eye liquid crystal shutter 44L is closed.

In the embodiments, the control unit 20 have given an instruction to the transmitting unit 24 to transmit the infrared synchronizing signal based on the reference synchronizing signal input from the external image supply device, however, the reference synchronizing signal is not limited to that input externally, but the projector 1 itself (for example, the control unit 20) may generate the reference synchronizing signal.

In the embodiments, the infrared synchronizing signal has been transmitted and received between the transmitting unit 24 of the projector 1 and the receiving unit 41 of the liquid crystal shutter glasses 2, however, the synchronizing signal is not limited to infrared light. For example, optical communication using other light than infrared light may be used.

In the projector 1 of the embodiments, the transmissive liquid crystal light valves 12R, 12G, 12B are used as light modulation devices, however, reflective light modulation devices such as reflective liquid crystal light valves may be used. Further, a micro mirror array device that modulates light output from a light source or the like may be used by controlling the output direction of the incident light with respect to each micro mirror as a pixel.

In the embodiments, as a system of supplying image information from the image supply device to the projector 1, a frame sequential system of alternately outputting image information for left eye and image information for right eye in units of frames may be employed, but the supply system of the image information is not limited to that. For example, a side-by-side system of arranging image information for left eye and image information for right eye side by side within one frame may be employed. In this case, the projector 1 may separate the supplied image information into image information for left eye and image information for right eye and alternately display images based on the respective image information.

What is claimed is:

1. A projector comprising:
   an image projection unit that projects an image for left eye and an image for right eye; and
   a transmitting unit that transmits a synchronizing signal for synchronization with switching between the image for left eye and the image for right eye,
   wherein the transmitting unit is arranged to adjust a transmission direction of the synchronizing signal with respect to the image projection unit.

2. The projector according to claim 1, further comprising a casing containing the image projection unit,
   wherein the transmitting unit is integrally provided with the casing.

3. The projector according to claim 1, wherein the transmitting unit rotates with respect to the casing.

4. The projector according to claim 1, wherein the transmitting unit includes plural transmitters that transmit the synchronizing signal.

5. The projector according to claim 4, wherein the plural transmitters are placed so that respective transmission directions may be different from one another.

6. The projector according to claim 1, further comprising a transmission direction adjustment unit that adjusts the transmission direction in response to an installation condition of the projector.

7. The projector according to claim 6, wherein the transmission direction adjustment unit adjusts the transmission direction in response to whether the projector takes a predetermined basic position or an inverted position formed by inverting a vertical position of the basic position.

8. The projector according to claim 7, wherein, when the position of the projector is the inverted position, the transmission direction adjustment unit transmits the synchronizing signal toward a lower side than in the case of the basic position.

9. The projector according to claim 6, wherein the transmission direction adjustment unit adjusts the transmission direction in response to a tilt of the projector with respect to a projection surface on which the image is projected.

10. The projector according to claim 9, wherein the transmission direction adjustment unit transmits the synchronizing signal toward an opposite side to a side toward which an image is larger due to distortion caused by the tilt of the projector.

11. The projector according to claim 6, wherein the image projection unit has a lens-shift function of adjusting a projection location of the image by shifting a projection lens perpendicularly to an optical axis, and
   the transmission direction adjustment unit adjusts the transmission direction in response to an adjustment condition of the projection location using the lens-shift function.

12. The projector according to claim 11, wherein the transmission direction adjustment unit transmits the synchronizing signal toward a side to which the projection location shifts using the lens-shift function.

13. The projector according to claim 5, further comprising a detection unit that detects an installation condition of the projector,
   wherein the transmission direction adjustment unit adjusts the transmission direction in response to a detection result of the detection unit.

14. A projection system comprising:
   the projector according to claim 1; and
   shutter glasses that receive the synchronizing signal transmitted from the projector and open a shutter for left eye and a shutter for right eye based on the received synchronizing signal.

15. A control method of a projector including an image projection unit that projects an image for left eye and an image for right eye, and a transmitting unit that transmits a synchronizing signal for synchronization with switching between the image for left eye and the image for right eye, comprising:
   projecting the image for left eye and the image for right eye by the image projection unit;
   transmitting the synchronizing signal by the transmitting unit; and
   adjusting a transmission direction of the synchronizing signal with respect to the image projection unit.

16. The control method of the projector according to claim 15, further comprising detecting an installation condition of the projector,
   wherein, at the adjusting, the transmission direction is adjusted based on a detection result at the detecting.

17. The control method of the projector according to claim 16, wherein, at the detecting, whether the projector takes a predetermined basic position or an inverted position formed by inverting a vertical position of the basic position is detected, and
   at the adjusting, the transmission direction is adjusted based on the detected position of the projector.

18. The control method of the projector according to claim 16, wherein, at the detecting, a tilt of the projector with respect to a projection surface on which the image is projected is detected, and
   at the adjusting, the transmission direction is adjusted based on the detected tilt of the projector.

19. The control method of the projector according to claim 16, wherein, at the detecting, an adjustment condition of a projection location using a lens-shift function is detected, and
   at the adjusting, the transmission direction is adjusted based on the detected adjustment condition of the projection location.

* * * * *